United States Patent
Van Wynsberghe et al.

(10) Patent No.: US 6,619,692 B2
(45) Date of Patent: Sep. 16, 2003

(54) AIR BAG INFLATORS

(75) Inventors: Roy D. Van Wynsberghe, Mesa, AZ (US); Lee D. Bergerson, Fountain Valley, CA (US); Paul A. Bowers, Ray, MI (US); Dean M. Esterberg, Tempe, AZ (US); Ernst M. Faigle, Dryden, MI (US); Homer W. Fogle, Jr., Mesa, AZ (US); Brian R. Pitstick, Mesa, AZ (US); Christopher C. Shih, Torrance, CA (US); Ivan L. Stonich, Hermosa Beach, CA (US); Eric N. Streif, Higley, AZ (US); Timothy A. Swann, Mesa, AZ (US); Bryan W. Shirk, Mesa, AZ (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/818,129

(22) Filed: Mar. 27, 2001

(65) Prior Publication Data

US 2002/0140217 A1 Oct. 3, 2002

(51) Int. Cl.⁷ .............................................. B60R 21/26
(52) U.S. Cl. ...................................... 280/741; 280/735
(58) Field of Search ................................ 280/734, 735, 280/736, 737, 741; 102/530, 202.5

(56) References Cited

U.S. PATENT DOCUMENTS

| 2,911,504 | A |   | 11/1959 | Cohn |         |
|-----------|---|---|---------|------|---------|
| 3,503,814 | A |   | 3/1970  | Helsm, Jr. | |
| 3,724,870 | A |   | 4/1973  | Kurokawa et al. | |
| 5,167,426 | A |   | 12/1992 | Mihm et al. | |
| 5,460,405 | A | * | 10/1995 | Faigle et al. | 280/735 |
| 5,880,921 | A |   | 3/1999  | Tham et al. | |
| 5,984,350 | A |   | 11/1999 | Hagan et al. | |
| 6,149,190 | A | * | 11/2000 | Galvin et al. | 280/735 |
| 6,167,809 | B1 | * | 1/2001 | Robinson et al. | 102/235 |
| 6,431,594 | B1 |   | 8/2002 | Swann et al. | |

FOREIGN PATENT DOCUMENTS

EP          0903487          3/1999

OTHER PUBLICATIONS

U.S. patent application Ser. No. 09/755,704, filed Jan. 5, 2001 entitled "Air Bag Inflator".
U.S. patent application Ser. No. 09/756,409, Filed Jan. 8, 2001 entitled "Seat Belt Webbing Pretensioner Using MEMS Devices".
U.S. patent application Ser. No. 09/843,546, Filed Apr. 26, 2001 entitled "Initiators for Air Bag Inflators".
U.S. patent application Ser. No. 09/933,926, filed Aug. 21, 2001 entitled "Inflatable Seat Belt Using MEMS Devices".
Article, D. Lewis, et al., entitled "Digital Micropulsion", Sensors and Actuators A; Physical, vol. 80, No. 2, Elsevier, Mar. 2000, p. 143–154.

* cited by examiner

Primary Examiner—Paul N. Dickson
Assistant Examiner—David R. Dunn
(74) Attorney, Agent, or Firm—Tarolli, Sundheim, Covell & Tummino L.L.P.

(57) ABSTRACT

An inflator (10) includes an assembly (31) comprising a plurality of individually energizable microelectromechanical system (MEMS) devices (30) for, when energized, actuating the inflator. The assembly (31) further comprises a sensor mechanism (60) for sensing a condition of the inflator (10) and for generating a control signal indicative of the sensed condition. The plurality of MEMS devices (30) are responsive to the control signal to control actuation of the inflator (10).

20 Claims, 4 Drawing Sheets

AIR BAG INFLATORS

BACKGROUND OF THE INVENTION

1. Technical Field

The present invention relates to a vehicle occupant protection apparatus and, in particular, to an inflator for an inflatable vehicle occupant protection device, such as an air bag.

2. Description of the Prior Art

European Patent Application EP 0 903 487 A2 describes an integrated pulsed propulsion system for a microsatellite and, in particular, a microthruster for a microsatellite. The microthruster is formed with a chamber closed by a diaphragm, which acts as a blow-out disk. A fluid, such as an inert gas, is disposed within the chamber. Heating of the gas causes the gas pressure to increase until the diaphragm ruptures, which, in turn, causes the gas to flow out of the chamber. The flowing gas acts as a propellant, and provides a small unit of force. The microthruster is adapted to be formed by known batch processing methods with 104 to 106 microthrusters per wafer. The unit of force can be scaled by varying the number of microthrusters used for an application, the geometry of the chamber, and the type of fluid used within the chamber.

The microthruster described in EP 0 903 487 A2 is described elsewhere in the literature as consisting of a 3-layer sandwich. The top layer contains an array of thin diaphragms (0.5 micron thick silicon nitride, 190 or 290 or 390 microns square). The middle layer contains an array of through-holes (Schott FOTURAN® photosensitive glass, 1.5 mm thick, 300, 500, or 700 micron diameter holes), which are loaded with propellant. The bottom layer contains a matching array of polysilicon micro-resistors. The bottom two layers are bonded together, propellant is added to the middle layer, then the top layer is bonded to complete the assembly. With different sizes of plenum holes, diaphragms, and resistors, many different configurations can be assembled.

This type of microthruster is one type of device known in the art as a "microelectromechanical system device", or "MEMS device". This type of device is known for use in a variety of applications. For example, U.S. Pat. No. 5,880,921 discloses a monolithically integrated switched capacitor bank using MEMS technology.

SUMMARY OF THE INVENTION

The present invention is an actuatable inflator for an inflatable vehicle occupant protection device. The inflator comprises an assembly comprising a plurality of individually energizable microelectromechanical system (MEMS) devices for, when energized, actuating the inflator. The assembly further comprises a sensor mechanism for sensing a condition of the inflator and for generating a control signal indicative of the sensed condition. The plurality of MEMS devices are responsive to the control signal to control actuation of the inflator.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

The present invention relates to a vehicle occupant protection apparatus and, in particular, to an inflator for an inflatable vehicle occupant protection device, such as an air bag.

Figure 1:
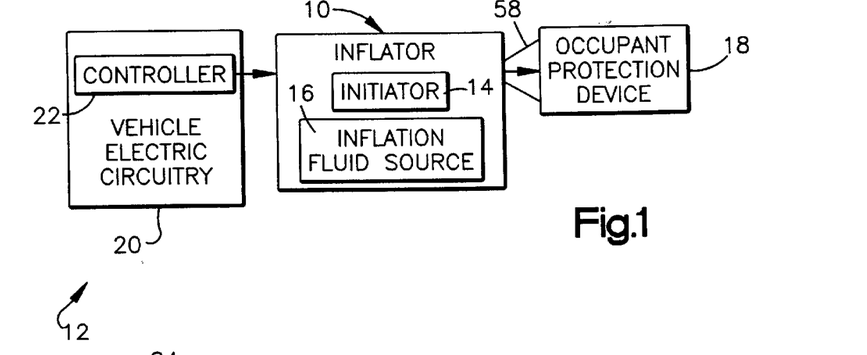
FIG. 1 is a block diagram of an apparatus for helping to protect a vehicle occupant, including an inflator constructed in accordance with a first embodiment of the present invention.

As representative of the present invention, FIG. 1 illustrates schematically an inflator 10. The inflator 10 forms part of an apparatus 12 for helping to protect a vehicle occupant. The inflator 10 includes an electrically energizable initiator 14 and an inflation fluid source 16 that is actuatable by the initiator.

The apparatus 12 includes a particular actuatable vehicle occupant protection device in the form of an air bag 18. Other actuatable vehicle occupant protection devices that can be used in accordance with the invention include, for example, inflatable seat belts, inflatable knee bolsters, inflatable head liners, inflatable side curtains, knee bolsters actuated by air bags, and seat belt pretensioners.

The apparatus 12 further includes vehicle electric circuitry 20 for actuating the initiator 14 of the inflator 10 when it is desired to help protect the vehicle occupant by actuating the device 12.

The vehicle electric circuitry 20 includes a controller 22. The controller 22 preferably includes one or more microprocessors for controlling operation of the inflator 10. The controller 22 may, for example, be a plurality of discrete components and/or a combination of discrete components and integrated circuits. In one example, the controller 22 is a microcomputer that receives sensory input from one or more sources, such as occupant condition sensors and vehicle condition sensors, and, using the sensory input, makes determinations for control of the inflator 10.

The inflator 10 (FIGS. 2–6) includes a plurality of microelectromechanical system (MEMS) devices 30. The MEMS devices 30 may be included in the initiator 14, or may be included in the inflation fluid source 16. If the MEMS devices 30 are included in the initiator 14, the MEMS devices are used to help actuate the inflation fluid source 16 of the inflator 10. If the MEMS devices 30 are included in the inflator 10 as part of the inflation fluid source 16, the MEMS devices are used to provide inflation fluid for inflating the air bag 18.

In the embodiment illustrated in FIGS. 2–6, the MEMS devices 30 are included in an assembly 31 that forms all or a portion of the initiator 14 of the inflator 10. The assembly 31 also includes a sensor mechanism 60, described below in detail.

The plurality of MEMS devices 30, as incorporated in the initiator 14, can be configured in any one of numerous different ways. For example, in the assembly/initiator shown in FIG. 2, three of the MEMS devices 30 are included in the assembly 31.

Figure 4:
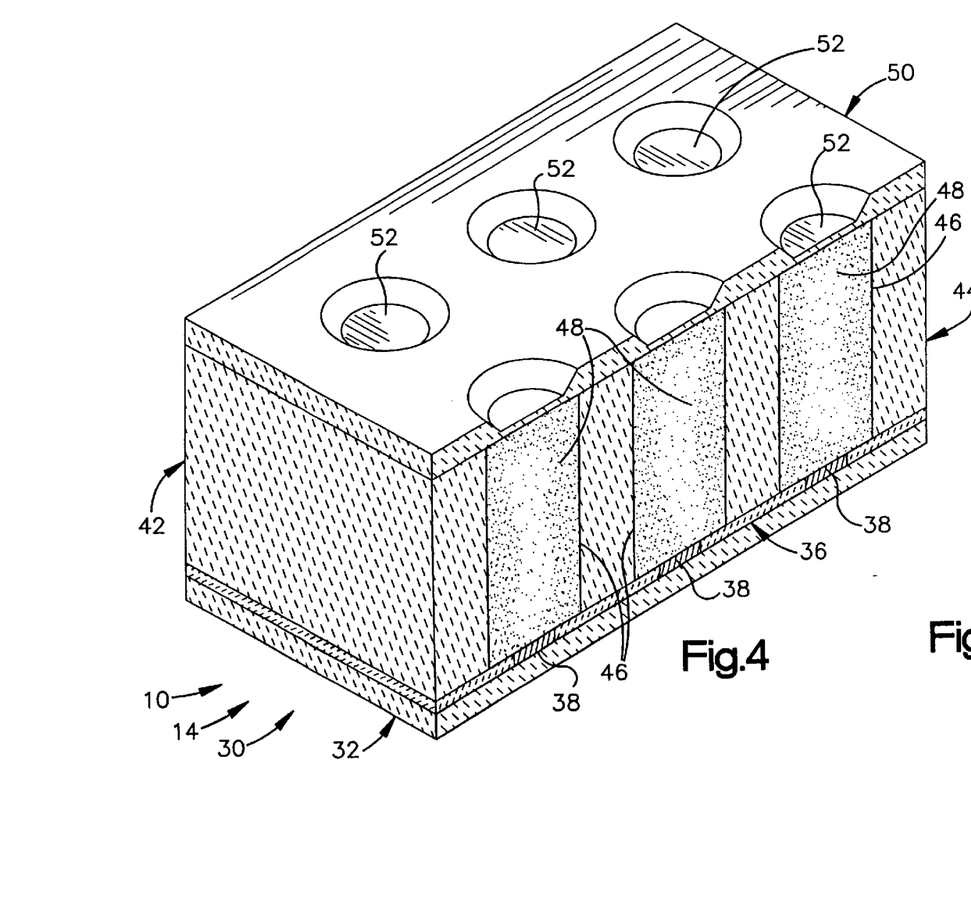
FIG. 4 is a partial perspective view of a MEMS device that forms part of the initiator assembly of FIG. 2.
Figure 5:
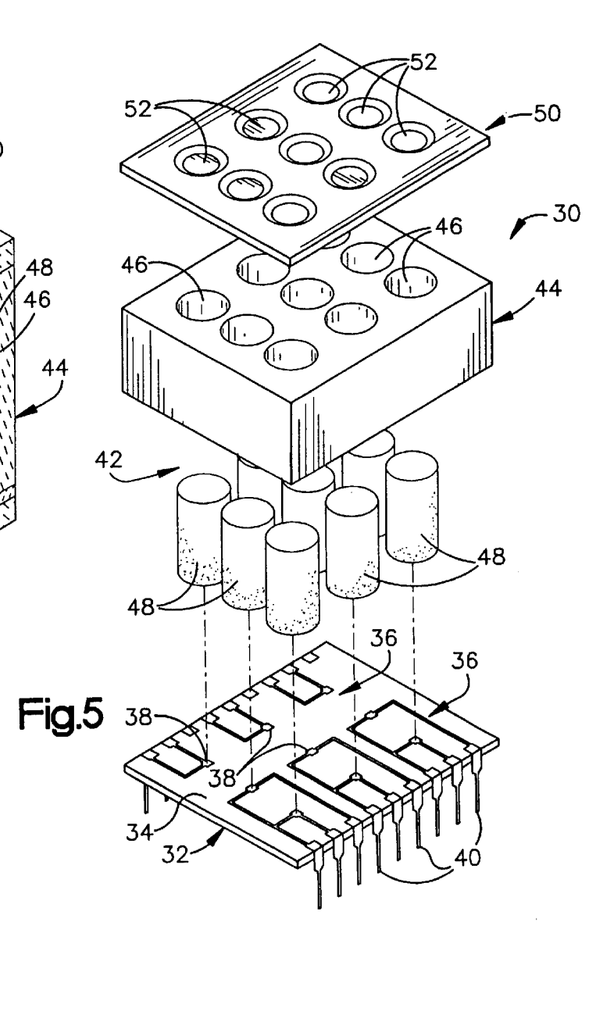
FIG. 5 is an exploded perspective view of the MEMS device of FIG. 4.

Each one of the MEMS devices 30 is configured as shown in FIGS. 4 and 5. Each one of the MEMS devices 30 is a multi-layered device that may be manufactured in a manner similar to that described in European Patent Application EP 0 903 487 A2, and in the article D. Lewis, et al., "Digital Micropropulsion", Sensors and Actuators A: Physical, Vol. 80, No. 2, Elsevier, March, 2000, p. 143–154.

Each MEMS device 30 includes a bottom layer or base 32. The base 32 may be made using standard complementary metal oxide semiconductor (CMOS) processes. The base 32 may be made from silicon or other suitable material, such a polyimide or ceramic.

The base 32 has a rectangular configuration and includes electric circuitry 36. The electric circuitry on the base 32 may include address and control electronics. The electric circuitry 36 also includes a plurality of individually energizable electric heating elements 38 connected with terminal pins 40. In the illustrated embodiment, the electric circuitry 36 includes nine individually energizable electric heating elements 38. The nine heating elements 38 are spaced apart in a rectangular 3×3 array on the base 32.

The heating elements 38 may be polysilicon resistors or other micro-resistors, such as nickel, niobium and niobium nitride. The heating elements 38 may, alternatively, be made as a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, Mount Vernon, N.Y., Internet site www.sigmundcohn.com, under the brand name PYROFUZE®. When the two metallic elements of the reactive bridge are brought to the initiating temperature by flow of electric current, they alloy rapidly, which results in instant deflagration without support of oxygen.

The MEMS device 32 also includes a middle layer 42 formed on the base 32. The middle layer 42 includes a propellant block 44. The propellant block 44 defines a series of cylindrical plenums or propellant chambers 46. In the illustrated embodiment, the propellant block 44 includes nine propellant chambers 46. The nine propellant chambers 46 are spaced apart in the propellant block 44 in the same rectangular 3×3 array as the nine heating elements 38 on the base 32. The heating elements 38 are associated in a one-to-one relationship with the propellant chambers 46 for, when energized, heating the contents of the propellant chambers.

One suitable material for the middle layer 42 is hard anodized aluminum. Another suitable material is Foturan brand photosensitive glass. Foturan is a registered trademark of Schott Glaswerke of Mainz, Germany for its products made of glass or glass ceramic materials. These materials can be used to make very fine structures with tight tolerances and high aspect ratios (hole depth to hole width).

The middle layer 42 of the MEMS device 30 also includes, in each one of the chambers 46, contents that are heatable to increase the pressure in the chamber. In the illustrated embodiment, the contents of the chambers 46 are bodies 48 of a solid propellant material, or pyrotechnic material, which is actuatable, or ignitable, upon the application of heat, to produce fluid under pressure. Each propellant body 48 has a cylindrical configuration and fills a respective one of the propellant chambers 46. One suitable material for the propellant bodies 48 is zirconium potassium perchlorate, which is commonly used in igniters for air bag inflators. Another suitable material is potassium dinitrobenzofuroxan (KDNBF).

Each device 30 also includes a top layer or outer layer 50 having a plurality of individually rupturable segments or diaphragms 52, which serve as burst disks. The diaphragms 52 are thin-walled portions of the outer layer 50. In the illustrated embodiment, the outer layer 50 includes nine individual diaphragms 52. The nine diaphragms 52 are spaced apart in the outer layer 50 in the same rectangular 3×3 array as the nine propellant chambers 46 and the nine heating elements 38.

The outer layer 50 may be made from aluminum tape or Kapton brand tape. The diaphragms 52 may be thin silicon nitride remaining after an anisotropic wet etch through a silicon wafer. Other suitable materials include ceramics, such as silicon carbide, and metals. The three layers 32, 42 and 50 of the MEMS device 30 may be bonded together with a high performance adhesive tape or an aerospace grade RTV adhesive.

The individual diaphragms 52 of the outer layer 50 are associated in a one-to-one relationship with the individual propellant chambers 46. Each diaphragm 52 closes a respective propellant chamber 46. Each one of the diaphragms 52 is rupturable due to an increase in pressure in its associated chamber 46 to enable flow of fluid out of the chamber.

Figure 2:
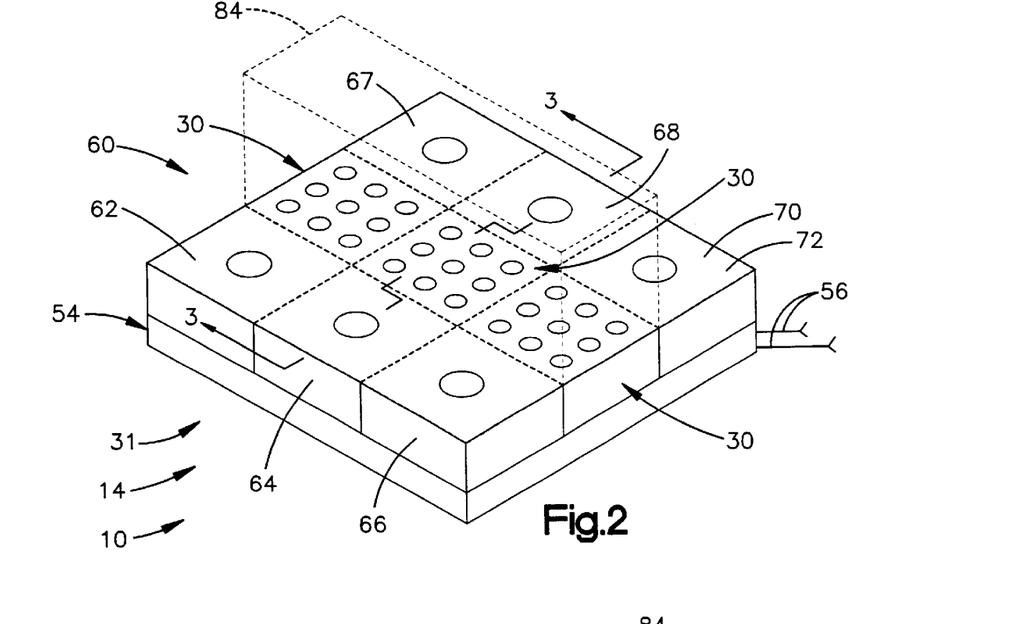
FIG. 2 is a schematic perspective view of a MEMS initiator assembly that forms part of the inflator of FIG. 1.
Figure 3:
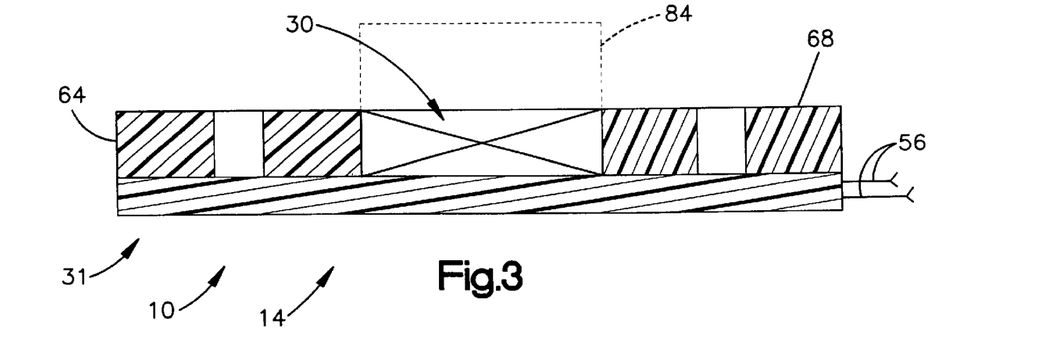
FIG. 3 is a schematic sectional view of the initiator assembly of FIG. 2.

The assembly 31 has a base 54, on which the MEMS devices 20 are mounted, and a pair of lead wires 56. The lead wires 56 are electrically connected with pin mounting openings (not shown) in the assembly base 54 for receiving the terminal pins 40 of the MEMS devices 30. The terminal pins 40 of each MEMS device 30 engage in the pin mounting openings of the assembly base 54 to connect the MEMS devices electrically with the lead wires 56. The lead wires 56 are electrically connected with the vehicle electric circuitry 20.

Also mounted on the base 54 of the assembly 31 is a sensor mechanism 60. The sensor mechanism 60 is operative, as described below, for sensing a condition of the inflator and for generating a control signal indicative of the sensed condition. The sensor mechanism 60 in the illustrated embodiment comprises a plurality of individual sensors. It should be understood that the sensor mechanism 60 could comprise only one sensor. Each one of the individual sensors is small enough to fit onto one chip-like assembly 31 with the MEMS devices 30.

The sensor mechanism 60 includes a temperature sensor 62 on the assembly. The temperature sensor 62 is operative to monitor the internal temperature of the inflator 10.

A humidity sensor 64 is also included in the sensor mechanism 60. The humidity sensor 64 is operative to monitor the internal humidity of the inflator.

The sensor mechanism 60 also includes a gas analysis device 66. The gas analysis device is operative to monitor the composition of gas in the inflator 10, such as an inflation fluid.

The sensor mechanism 60 further includes a pressure sensor 67. The pressure sensor 67 is operative to monitor the internal pressure of the inflator 10.

The sensor mechanism 60 also includes an accelerometer 68. The accelerometer 68 is operative to monitor acceleration and deceleration of the inflator 10.

The sensor mechanism 60 further includes a piezoelectric generator 70. The piezoelectric generator 70 is operative in response to vibratory energy to generate electric current to power the assembly 31. The assembly 31 also includes a capacitor 72 together with the piezoelectric generator 60, to store power generated by the generator. Thus, the power supply for the assembly 31 can be located inside the inflator 10, with no wiring passing through an exterior wall of the inflator for that purpose.

Figure 6:
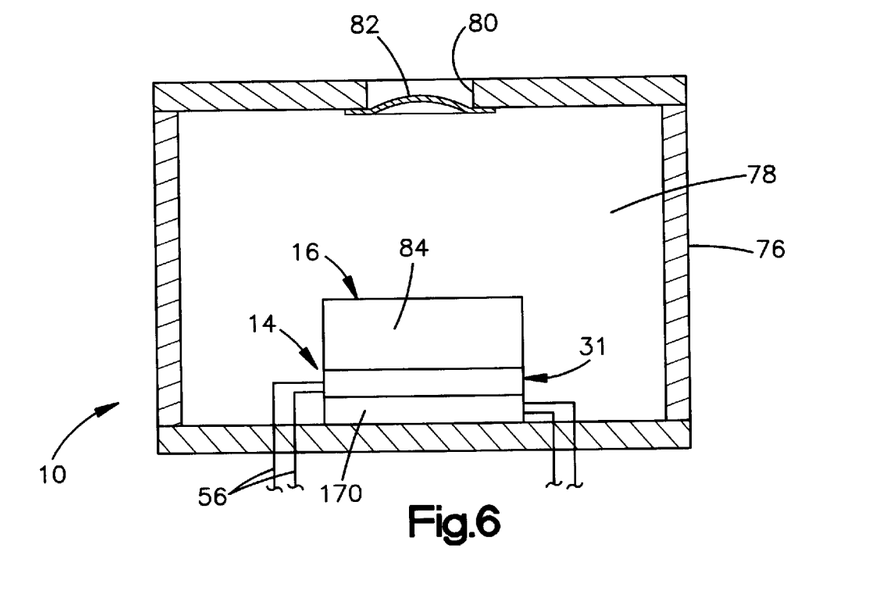
FIG. 6 is a schematic illustration, partially in section, of the inflator of FIG. 1.

The assembly 31 is mounted in the inflator 10 in a manner shown schematically in FIG. 6. The inflator 10 includes a container 76 defining a chamber 78 and having an opening 80. The opening 80 is closed by a burst disk 82. The container 76 contains the inflation fluid source 16, which in the illustrated embodiment comprises a body of ignitable material 84 in the chamber 78. The assembly 31 is mounted adjacent the body of ignitable material 84, in the chamber 78.

In the event of a vehicle collision or other event for which protection of the vehicle occupant is desired, the vehicle electric circuitry 20 sends an actuation signal to the inflator 10. The vehicle electric circuitry 20 is operable to provide an actuation signal for energizing any selected one or more of the MEMS devices 30 in the initiator 14 of the inflator 10, at a selected time. In addition, the vehicle electric circuitry 20 is operable to provide an actuation signal for energizing any selected one or more of the heating elements 38 within each one of the MEMS devices 30, at a selected time. Thus, the inflator 10 is effectively "digital" in construction and operation, that is, comprising a large number of discrete, individually actuatable inflation fluid sources.

When an individual heating element 38 of one of the MEMS devices 30 is energized, it generates heat, which is transmitted into the associated propellant body 48. The propellant body 48 ignites and generates combustion products under pressure, including heat. The increased pressure in the propellant chamber 46 causes the associated diaphragm 52 of the top layer 50 to rupture, which enables the combustion products to flow out of the propellant chamber.

The combustion products are directed against the body of ignitable material 84 and ignite it. Ignition of the body of ignitable material 84 generates inflation fluid that increases the pressure in the chamber 78. The burst disk 82 ruptures and the inflation fluid is directed by a reaction canister or other device shown schematically at 86 (FIG. 1), to the occupant protection device 18.

In the illustrated embodiment, the occupant protection device 18 is an air bag, and the air bag is inflated by the fluid flowing from the inflator 10. The apparatus 12 could include a device other than a reaction canister for directing the fluid to the occupant protection device 18. For example, the apparatus 12 could be a seat mounted air bag module with a diffuser that directs inflation fluid into an air bag, or a side curtain assembly including a fill tube that directs inflation fluid into an inflatable side curtain.

The fluid output of the inflator 10 is dependent on, and varies with, the number of MEMS devices 30 that are energized. Specifically, if relatively more of the MEMS devices 30 of the assembly 31 are energized, a relatively greater amount of combustion products is directed against the body of ignitable material 84, and the body of ignitable material burns more rapidly. This can increase the fluid output rate of the inflator 10. Conversely, if relatively fewer of the MEMS devices 30 are energized, a relatively lower amount of combustion products is directed against the body of ignitable material 84, and the body of ignitable material burns more slowly. This can lessen the fluid output rate of the inflator 10.

The fluid output of the inflator 10 is also dependent on the time at which each individual propellant body 48 in each MEMS device 30 is ignited, the volume of each propellant chamber 46, and the type and amount of propellant disposed in the propellant chambers.

In the microthruster application described in European Patent Application EP 0 903 487 A2, each plenum or propellant chamber is about 1.5 mm tall (axial length) and up to about 0.7 mm in diameter. The depth of each plenum chamber can be increased to up to 10 mm or more, and the diameter of each plenum can be increased by at least a factor of two. Also, a tapered chamber may be used, rather than a cylindrical chamber. A MEMS device for use in the inflator 10, having an array of from three to fifteen plenums, may be up to about one half inch square (in length and width). A plurality of individual actuatable devices of this size can provide an inflator having fluid output sufficient to inflate an air bag or other inflatable vehicle occupant protection device.

An inflator 10 in accordance with this embodiment of the invention can include a large number of propellant bodies 48, thus enabling a substantial range of tailoring of the fluid output of the inflator. The vehicle electric circuitry 20 can control the rate of fluid output of the inflator 10 over a period of time, by selectively causing the ignition of any one or more of a plurality of propellant bodies 48 over a selected period of time. The controller 22 is operative, in a known manner, to actuate the propellant bodies 48 all at once or in any controlled sequence depending on information about the vehicle event and occupant information received from appropriate sensors forming part of the vehicle electric circuitry 20.

An inflator in accordance with the invention can be made without the body of ignitable material 84. In that case, the combustion products of the MEMS devices would inflate the protection device 18 directly. The fluid output of such an inflator would be dependent on, and vary with, the number of MEMS devices that are energized and when they are energized.

The output of the sensor mechanism 60 is used to help control the actuation of the inflator 10. Specifically, some gas generating materials are sensitive to temperature and, when the temperature is higher, may require relatively less hot combustion products from the initiator 14 to be ignited as desired. Depending on the temperature sensed by the temperature sensor 62, the controller 22 can make a determination as to how many of the MEMS devices 30 need to be energized to improve combustion of the body of ignitable material.

The inflator 14 may be of the type in which the MEMS devices 30 are used to heat stored gas directly. In that case, the temperature of the stored gas can be monitored to improve the fluid output of the inflator. Depending on the temperature sensed by the temperature sensor 62, the controller 22 can make a determination as to how many of the MEMS devices 30 need to be energized to obtain a desired pressurization of the stored gas. The temperature sensor 62 can also be used to sense unusually high temperature of the inflator 14 when not actuated and, in response, initiate auto-ignition of the inflator.

The humidity sensor 64 of the sensor mechanism 60 is operative to monitor the internal humidity of the inflator 10. Some gas generating materials are sensitive to moisture and, when the humidity is higher, may require relatively more hot combustion products from the MEMS devices 30 to be ignited as desired.

During the life of the inflator, the gas analysis device 66 of the assembly 31 is operative to monitor the composition of gas in a stored gas inflator. The gas analysis device 66 monitors gas composition and provides an output to the controller 22 for use in, for example, controlling the sequence and timing of ignition of the MEMS devices 30. The gas analysis device 66 could include a Schottky diode for measuring hydrogen content or hydrogen pressure.

The pressure sensor 67 of the assembly 31 is operative to monitor the internal pressure of the inflator 10. The output of the pressure sensor 67, which is a control signal indicative of the pressure in the inflator 10, can be used in a closed loop feedback system to regulate combustion efficiency. For example, the controller 22 may determine that the pressure in the inflator 10 is below a predetermined threshold during the time when fluid is being directed from the inflator to the air bag 18. In response to such a determination, additional cells in the array of MEMS devices 30 can be energized to increase combustion and pressure in the inflator. Thus, the inflator can maintain combustion without a mechanical regulator, such as a valve. Also, an inflator 10 containing an ignitable gas generating material, such as the ignitable material 84, can maintain a minimum internal pressure needed to keep the gas generating material from starting to go out once it is ignited.

The output of the pressure sensor 67 can also be used to control the size of a burst disc opening. It may be desirable to control the extent of opening of a mechanical flow control device, such as the burst disc 82, during operation of the inflator 10. If MEMS devices are used to open the burst disc 82, the output of the pressure sensor 67 can be used to control the energizing of those MEMS devices 30.

The pressure sensor 67 can also be used to sense unusually high pressure in a fluid chamber and, in response, initiate auto-ignition of the inflator. Additionally, the pressure sensor 67 could be used to trigger a driver alert for low gas pressure in an inflator using gas stored under pressure.

The accelerometer 68 of the assembly 31 is operative to sense acceleration or deceleration of the inflator 10. The output of the accelerometer 68 can be provided to the controller 22 and used in a determination of whether to actuate the inflator 10. The presence of an accelerometer 68 within the inflator 10 in this manner can eliminate the need for an out-of-inflator sensor.

The piezoelectric generator 70 is operative in response to vibration energy to generate electric current to power the assembly 31. Because the assembly 31 also includes the capacitor 72, the power supply for the inflator 10 can be located inside the pressure vessel, with no wiring passing through the wall of the container 16 for this purpose. The controller 22 also can be inside the container 16, eliminating the need for the wires 56. The consolidation of the accelerometer 70 and the piezoelectric generator 68 onto a single MEMS chip such as the assembly 31 in this case would create a fully self-contained system that can sense a crash event and selectively initiate an appropriate response.

Figure 7:
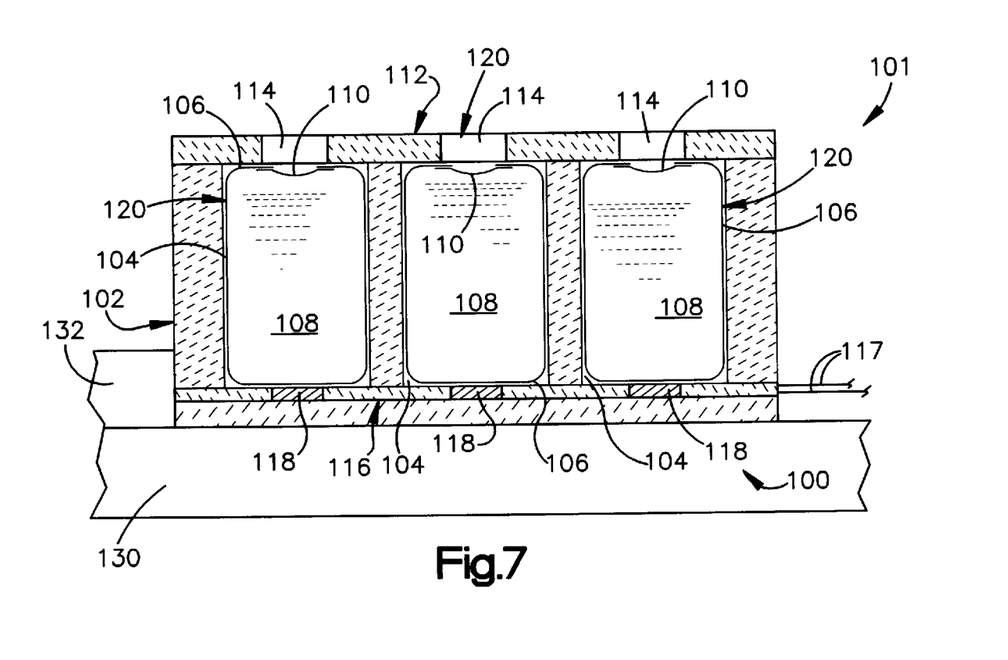
FIG. 7 is a schematic sectional view of a portion of an inflator constructed in accordance with a second embodiment of the present invention.

It is possible to use a fluid, rather than a solid propellant, in MEMS devices that are used in an inflator in accordance with the present invention. As an example, FIG. 7 illustrates schematically an inflator 100 constructed in accordance with a second embodiment of the invention. The inflator 100 uses MEMS devices to provide inflation fluid for inflating a vehicle occupant protection device.

The inflator 100 includes an assembly 101. The assembly 101 includes a housing 102, which defines three chambers 104. In each chamber 104 is located a container 106.

Each container 106 contains a fluid 108, which may or may not be under pressure. Each container 106 is sealed by a rupturable wall portion 110, such as a burst disk. A manifold 112 extends across the top of the housing 102. The manifold 112 has a plurality of fluid outlets 114, which are aligned in a one-to-one relationship with the rupturable wall portions 110 of the containers 106.

The assembly 101 includes a base 116, which extends across the bottom of the housing 102. The base 116 includes lead wires 117 electrically connected with a plurality of heating elements 118. The heating elements 118 are associated in a one-to-one relationship with the containers 106. Each individual combination of a heating element 118 and a container 106 forms a MEMS device 120. The lead wires 117 are also electrically connected with vehicle electric circuitry, such as the circuitry 20 (FIG. 1).

The assembly 101 further includes an assembly base 130. The base 116 is mounted on the assembly base 130. A sensor mechanism indicated schematically at 132 is also mounted on the assembly base 130, together with the base 116, as part of the assembly 101.

In the event of a vehicle collision or other event for which protection of a vehicle occupant is desired, the vehicle electric circuitry 20 sends an actuation signal over the lead wires 117 to the inflator 100. The vehicle electric circuitry is operable to provide an actuation signal for energizing any selected one or more of the MEMS devices 120. The outputs of the sensor mechanism 132 are used in controlling the energizing of the individual MEMS devices 120, in a manner as described above with reference to FIGS. 2–6.

When an individual MEMS device 120 is energized, its heating element 118 generates heat, which is transmitted into the associated container 106. The fluid 108 in the container 106 is heated and increases in pressure. The increased pressure causes the associated rupturable wall portion 110 of the container 106 to rupture, which enables the fluid 108 to flow out of the container.

The fluid 108 is directed, by the fluid outlets 114, to the occupant protection device. The fluid output of the inflator 100 is dependent on, and varies with, the number of MEMS devices 120 that are energized, and the time of actuation of each individual device. Therefore, the vehicle electric circuitry 20 can control the fluid output of the inflator 100, both in time and duration, by selectively energizing any one or more of a plurality of the MEMS devices 120 over a selected period of time.

Figure 8:
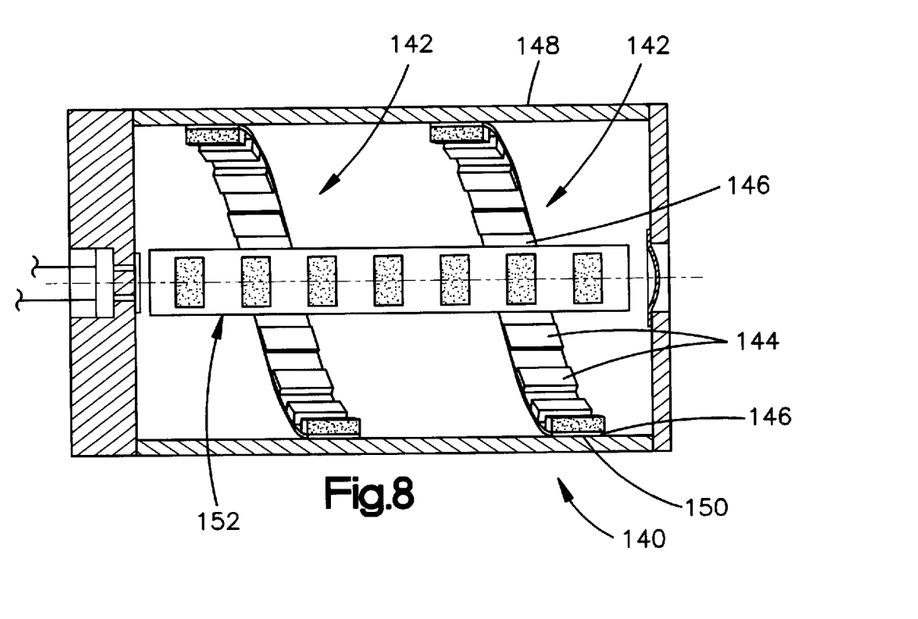
FIG. 8 is a schematic illustration, partially in section, of an inflator constructed in accordance with a third embodiment of the present invention.

A MEMS initiator assembly, including a sensor mechanism, can be placed at other locations in an inflator. For example, FIG. 8 shows an inflator 140 that includes a MEMS initiator assembly 142 of the type described above with reference to FIG. 2. The initiator assembly 142 includes a plurality of MEMS arrays 144 spaced apart along the length of a backing strip 146. The backing strip 146 may be attached to the inflator housing 148 with an adhesive 150, for example.

The initiator assembly 142 extends in a spiral pattern along the length of the inflator housing 148. The inflator also includes another MEMS initiator assembly 152 that extends longitudinally along the inflator housing 148.

Figure 9:
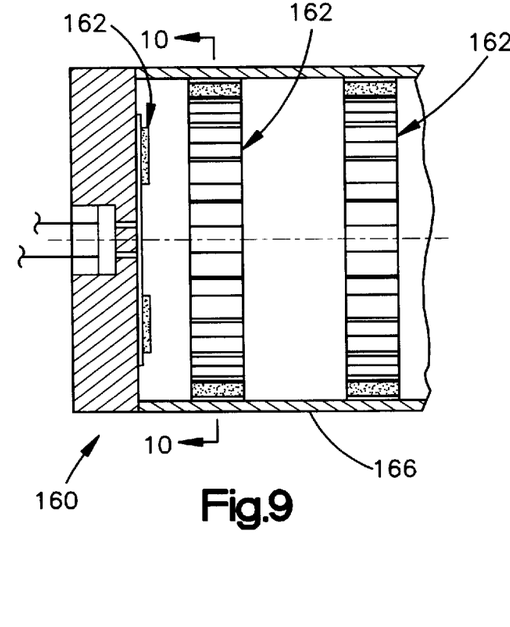
FIG. 9 is a schematic illustration, partially in section, of an inflator constructed in accordance with a third embodiment of the present invention.
Figure 10:
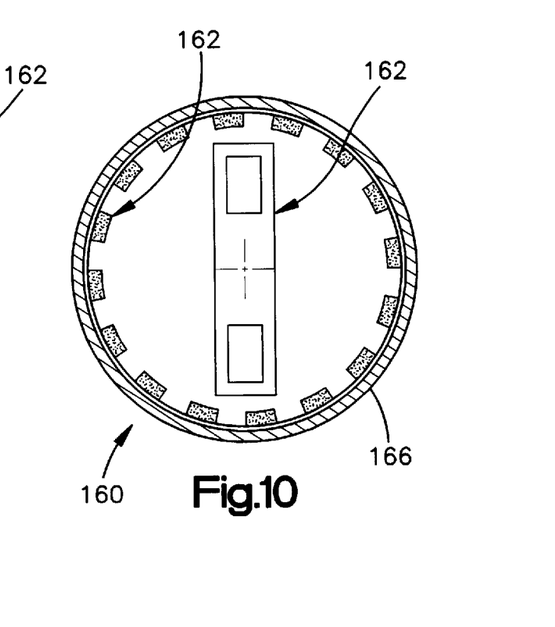
FIG. 10 is a sectional view taken along line 10—10 of FIG. 9.

FIGS. 9 and 10 show an inflator 160 that includes a plurality of MEMS initiator assemblies 162 of the type described above with reference to FIG. 2. One of the initiator assemblies 162 extends radially along an end wall 164 of the inflator housing 166. Other MEMS initiator assemblies 162 extend in a circumferential pattern around the inside wall of the inflator housing 166. Each of the initiator assemblies 162 shown in FIGS. 8 and 9 may include one or more sensors assemblies of the type described above with reference to FIG. 2.

With MEMS initiator assemblies, such as the assemblies 142 and 162, thus provided at different locations in an inflator, such as the inflators 140 and 160, the initiation process can be controlled to provide combustion products at different locations within a chamber in the inflator.

In accordance with another embodiment of the invention, a known piezoelectric reaction plate 170 (FIG. 6) is used as part of a MEMS initiator assembly 14 to measure, during actuation of the inflator 10, the recoil produced by the MEMS initiator. This measurement can help to determine how many of the MEMS devices 30 were energized, and can give a binary (yes/no) confirmation that the initiator 14 has functioned. The electrical output signal of the reaction plate 170 may be processed at a location off the MEMS initiator assembly 14, or on it. Other types of pressure sensors or force sensors may be used in place of the piezoelectric reaction plate 170, for this purpose.

From the above description of the invention, those skilled in the art will perceive improvements, changes and modifications in the invention. Such improvements, changes and modifications within the skill of the art are intended to be covered by the appended claims.

Having described the invention, we claim:

1. An actuatable inflator for an inflatable vehicle occupant protection device, said inflator comprising:
   an assembly including a base;
   said assembly further including a plurality of individually energizable microelectromechanical system (MEMS) devices for, when energized, actuating said inflator, said plurality of individually energizable microelectromechanical system (MEMS) devices being mounted on said base;
   said assembly further including a sensor mechanism for sensing a condition of said inflator and for generating a control signal indicative of said sensed condition, said sensor mechanism being mounted on said base;
   said plurality of MEMS devices being responsive to said control signal to control actuation of said inflator.

2. An inflator as set forth in claim 1 wherein said sensor mechanism is operative to sense a temperature in said inflator and to generate a control signal indicative of said sensed temperature.

3. An inflator as set forth in claim 2 comprising a controller for controlling how many of said plurality of MEMS devices are energized in response to said control signal indicative of said sensed temperature.

4. An inflator as set forth in claim 2 wherein said temperature sensor is used to sense excessive temperature in said inflator and to initiate an auto-ignition mechanism.

5. An inflator as set forth in claim 1 wherein each one of said plurality of MEMS devices has a size in the range of up to about one half inch square.

6. An actuatable inflator for an inflatable vehicle occupant protection device, said inflator comprising:
   an assembly including a plurality of individually energizable microelectromechanical system (MEMS) devices for, when energized, actuating said inflator;
   said assembly further including a sensor mechanism for sensing a condition of said inflator and for generating a control signal indicative of said sensed condition;
   said plurality of MEMS devices being responsive to said control signal to control actuation of said inflator,
   said sensor mechanism being operative to sense humidity in said inflator and to generate a control signal indicative of said sensed humidity.

7. An inflator as set forth in claim 6 comprising a controller for controlling how many of said plurality of MEMS devices are energized in response to said control signal indicative of said sensed humidity.

8. An actuatable inflator for an inflatable vehicle occupant protection device, said inflator comprising:
   an assembly including a plurality of individually energizable microelectromechanical system (MEMS) devices for, when energized, actuating said inflator;
   said assembly further including a sensor mechanism for sensing a condition of said inflator and for generating a control signal indicative of said sensed condition;
   said plurality of MEMS devices being responsive to said control signal to control actuation of said inflator,
   said sensor mechanism being operative to sense gas composition in said inflator and to generate a control signal indicative of said sensed gas composition.

9. An actuatable inflator for an inflatable vehicle occupant protection device, said inflator comprising:
   an assembly including a plurality of individually energizable microelectromechanical system (MEMS) devices for, when energized, actuating said inflator;
   said assembly further including a sensor mechanism for sensing a condition of said inflator and for generating a control signal indicative of said sensed condition;
   said plurality of MEMS devices being responsive to said control signal to control actuation of said inflator,
   said sensor mechanism being operative to sense pressure in said inflator and to generate a control signal indicative of said sensed pressure.

10. An inflator as set forth in claim 9 comprising a controller for controlling how many of said plurality of MEMS devices are energized in response to said control signal indicative of said sensed pressure.

11. An inflator as set forth in claim 9 wherein said pressure sensor is used to sense excessive pressure in said inflator and to initiate an auto-ignition mechanism.

12. An inflator as set forth in claim 9 wherein said pressure sensor is used to sense low gas pressure in said inflator.

13. An actuatable inflator for an inflatable vehicle occupant protection device, said inflator comprising:
   an assembly including a plurality of individually energizable microelectromechanical system (MEMS) devices for, when energized, actuating said inflator;
   said assembly further including a sensor mechanism for sensing a condition of said inflator and for generating a control signal indicative of said sensed condition;
   said plurality of MEMS devices being responsive to said control signal to control actuation of said inflator,
   said sensor mechanism being operative to sense acceleration or deceleration of said inflator and to generate a control signal indicative of said sensed acceleration or deceleration.

14. An inflator as set forth in claim 13 comprising a controller for controlling initiation of said inflator in response to said control signal indicative of said sensed acceleration or deceleration.

15. An actuatable inflator for an inflatable vehicle occupant protection device, said inflator comprising:

an assembly including a plurality of individually energizable microelectromechanical system (MEMS) devices for, when energized, actuating said inflator;

said assembly further including a sensor mechanism for sensing a condition of said inflator and for generating a control signal indicative of said sensed condition;

said plurality of MEMS devices being responsive to said control signal to control actuation of said inflator, said sensor mechanism being operative to sense a reaction force in said inflator and to generate a control signal indicative of said sensed reaction force.

16. An inflator as set forth in claim 15 wherein said sensor mechanism is operative to sense a reaction force indicative of the number of said MEMS devices that are energized during actuation of said inflator.

17. An actuatable inflator for an inflatable vehicle occupant protection device, said inflator comprising:

an inflation fluid source actuatable for providing inflation fluid;

an initiator assembly for actuating said inflation fluid source, said initiator assembly including a plurality of microelectromechanical system (MEMS) devices, each of said plurality of microelectromechanical system (MEMS) devices being individually energizable for actuating said inflation fluid source;

a sensor for sensing a condition of said inflator and for providing a condition signal indicative of the sensed condition; and electronic circuitry receiving the condition signal from said sensor and being responsive to the condition signal for energizing selected ones of said plurality of microelectromechanical system (MEMS) devices for actuating said inflation fluid source for providing a desired amount of inflation fluid.

18. An inflator as set forth in claim 17 wherein said sensor is a temperature sensor for sensing temperature.

19. An actuatable inflator for an inflatable vehicle occupant protection device, said inflator comprising:

an inflation fluid source actuatable for providing inflation fluid;

an initiator assembly for actuating said inflation fluid source, said initiator assembly including a plurality of microelectromechanical system (MEMS) devices, each of said plurality of microelectromechanical system (MEMS) devices being individually energizable for actuating said inflation fluid source;

a sensor for sensing a condition of said inflator and for providing a condition signal indicative of the sensed condition; and electronic circuitry receiving the condition signal from said sensor and being responsive to the condition signal for energizing selected ones of said plurality of microelectromechanical system (MEMS) devices for actuating said inflation fluid source for providing a desired amount of inflation fluid, wherein said sensor is a humidity sensor for sensing humidity.

20. An actuatable inflator for an inflatable vehicle occupant protection device, said inflator comprising:

an inflation fluid source actuatable for providing inflation fluid;

an initiator assembly for actuating said inflation fluid source, said initiator assembly including a plurality of microelectromechanical system (MEMS) devices, each of said plurality of microelectromechanical system (MEMS) devices being individually energizable for actuating said inflation fluid source;

a sensor for sensing a condition of said inflator and for providing a condition signal indicative of the sensed condition; and electronic circuitry receiving the condition signal from said sensor and being responsive to the condition signal for energizing selected ones of said plurality of microelectromechanical system (MEMS) devices for actuating said inflation fluid source for providing a desired amount of inflation fluid, wherein said sensor is operative to sense a reaction force of said inflator.

* * * * *